(12) United States Patent
Gong et al.

(10) Patent No.: US 12,220,950 B2
(45) Date of Patent: Feb. 11, 2025

(54) TIRE MOUNTING APPARATUS

(71) Applicant: XIAMEN LENCO CO., LTD., Fujian (CN)

(72) Inventors: Yi Gong, Xiamen (CN); Hui Liu, Xiamen (CN); Liangsheng Lu, Xiamen (CN); Fusheng Chen, Xiamen (CN)

( * ) Notice: Subject to any disclaimer, the term of this patent is extended or adjusted under 35 U.S.C. 154(b) by 421 days.

(21) Appl. No.: 17/834,913

(22) Filed: Jun. 7, 2022

(65) Prior Publication Data
US 2023/0391149 A1   Dec. 7, 2023

(51) Int. Cl.
*B60C 25/05*   (2006.01)

(52) U.S. Cl.
CPC ...... *B60C 25/0572* (2013.01); *B60C 25/0503* (2013.01); *B60C 25/053* (2013.01); *B60C 25/0566* (2013.01)

(58) Field of Classification Search
CPC ............ B60C 25/0572; B60C 25/0503; B60C 25/053; B60C 25/0566

USPC .................................. 157/1.1, 1.17
See application file for complete search history.

(56) References Cited

U.S. PATENT DOCUMENTS

| 3,826,299 | A  | * | 7/1974 | Curchod | ............... | B60C 25/135 |
| | | | | | | 157/1.24 |
| 6,527,032 | B2 | * | 3/2003 | Corghi | ................ | B60C 25/0545 |
| | | | | | | 157/14 |
| 8,783,326 | B1 | * | 7/2014 | Vaninger | ............. | B60C 25/0551 |
| | | | | | | 157/1.24 |
| 9,662,946 | B2 | * | 5/2017 | Corghi | .................. | B60C 25/138 |

* cited by examiner

*Primary Examiner* — Hadi Shakeri

(57) ABSTRACT

A tire mounting apparatus includes a rim positioning mechanism, a wheel support mechanism and a mounting frame that are disposed on a base in sequence, and a tire pressing mechanism disposed on the mounting frame. The rim positioning mechanism is configured to position a hub of a rim. The wheel support mechanism is configured to support a side peripheral edge of a wheel. The tire pressing mechanism is configured to press a side peripheral edge of a tire for pressing a bead of the tire into the rim. The operation is simple and labor-saving. The tire mounting efficiency can be improved and the labor intensity can be reduced.

13 Claims, 8 Drawing Sheets

TIRE MOUNTING APPARATUS

BACKGROUND OF THE INVENTION

1. Field of the Invention

The present invention relates to tire mounting technology, and more particularly to a tire mounting apparatus.

2. Description of the Prior Art

Compared with a hollow tire, a solid tire will not burst even if the surface of the solid tire is punctured by sharp objects, so it is safer for use. But, the solid tire also has defects. In general, solid tires are PU tires, which have small deformation, poor cushioning and shock absorption capabilities, and high cost. The weight of the solid tire is relatively large, which causes the driver to ride more strenuously.

In order to improve the above-mentioned defects of solid tires, an improved tire includes a solid inner tire A disposed between an outer tire B and a rim C to form a wheel having inner and outer tires, referring to FIG. 1. The solid inner tire A acts as a buffer interlayer, which improves the shock absorption performance of the wheel and reduces the consumption of the outer tire B. In the prior art, the solid inner tire A and the outer tire B are formed separately, and then assembled and mounted on the rim C. There is no special tool for mounting the tire. After the solid inner tire A and the outer tire B are placed on the rim C, a simple tool is used to press the bead of the outer tire B into the rim along the circumference of the rim C. The tire mounting efficiency is low and the labor intensity is high.

SUMMARY OF THE INVENTION

The primary object of the present invention is to provide a tire mounting apparatus, which is used to assist in the assembly of a wheel having inner and outer tires for improving the tire mounting efficiency and reducing the labor intensity.

In order to achieve the above object, the present invention adopts the following technical solutions:

A tire mounting apparatus comprises a base, a mounting frame, a rim positioning mechanism, a wheel support mechanism, and a tire pressing mechanism. The rim positioning mechanism, the wheel support mechanism and the mounting frame are disposed on the base in sequence. The tire pressing mechanism is disposed on the mounting frame and located above the wheel support mechanism. The rim positioning mechanism is configured to position a hub of a rim. The wheel support mechanism is configured to support a side peripheral edge of a wheel. The tire pressing mechanism is configured to press a side peripheral edge of a tire for pressing a bead of the tire into the rim.

Preferably, the rim positioning mechanism includes a rim positioning platform located at one end of the base, and an upper end of the rim positioning platform has a positioning hole for insertion the hub of the rim.

Preferably, the rim positioning platform is an adjustable screw rod that is threadedly connected to the base.

Preferably, the rim positioning mechanism further includes a retaining plate, a press rod, a guide rod, and a press head. A first end of the retaining plate is pivotally connected to the end of the base, so that the retaining plate can rotate in a horizontal direction. The rim positioning platform is disposed on the first end of the retaining plate. A lower end of the guide rod is vertically connected to a second end of the retaining plate. When in use, the guide rod is inserted between spokes of the rim. One end of the press rod is sleeved on the guide rod. The press rod is adjustable up and down. The press head is disposed on another end of the press rod for positioning an upper end of the hub of the rim.

Preferably, the wheel support mechanism includes a lower roller for rolling and supporting a side peripheral edge of the rim and a lower roller bracket for installing the lower roller.

Preferably, the base is in the form of a rod and is arranged horizontally. The lower roller bracket is fitted on a middle portion of the base. The lower roller is rotatably connected to the lower roller bracket. A lower end of the mounting bracket is fitted on another end of the base.

Preferably, the tire pressing mechanism includes an upper roller and a push roller. The upper roller is located above one side of the wheel support mechanism close to the mounting frame for rolling and pressing down the side peripheral edge of the tire. An axial direction of the push roller is arranged vertically. The push roller is located above the wheel support mechanism for pushing the bead of the tire out of an outer ring of the rim.

Preferably, a lower end of the push roller has an annular guide flange.

Preferably, the tire pressing mechanism further includes an upper roller bracket. The upper roller bracket is slidably connected to the mounting frame. The upper roller bracket is movable up and down relative to the mounting frame. The upper roller is rotatably connected to one end of the upper roller bracket. The push roller is installed on one side of the upper roller bracket and is movable horizontally.

Preferably, the mounting frame includes a slide rail and a slider. The slide rail is vertically disposed on one side of the mounting frame. The upper roller bracket is slidably connected to the slide rail through the slider.

Preferably, the tire pressing mechanism further includes a first toggle clamp. The first toggle clamp is vertically mounted on the side of the mounting frame and has a movable end connected to the upper roller bracket.

Preferably, the first toggle clamp is mounted on the mounting frame through a connecting plate. The connecting plate is fitted on the mounting frame and is positioned by an adjusting screw rod, and the height of the first toggle clamp is adjustable through a hand wheel.

Preferably, the tire pressing mechanism further includes a restricting block connected to the side of the upper roller bracket, a push roller retaining block slidably connected to the restricting block, a push rod connected to the push roller retaining block, and a second toggle clamp. The second toggle clamp is mounted on the push roller retaining block and has a movable end connected to the restricting block. The push roller is rotatably connected to a lower end of the push rod.

Preferably, an adjusting screw rod is disposed on the restricting block for positioning the movable end of the second toggle clamp, and the position of the second toggle clamp is adjustable through a hand wheel.

Preferably, the tire mounting apparatus further comprises an auxiliary roller and a connecting rod. The auxiliary roller is mounted on the upper roller bracket through the connecting rod. The auxiliary roller and the upper roller are arranged side by side.

Through the above technical solutions, the present invention provides the wheel support mechanism for supporting the wheel and the tire pressing mechanism for pressing down the tire and for the bead of the tire to be engaged into the rim. The wheel can be rotated manually when mounting the tire. During the rotation of the wheel with the rim positioning mechanism as the axis, the entire bead of the tire can be evenly engaged into the groove of the rim to complete the assembly. The invention is simple in operation and labor-saving. With the assistance of the present invention, the tire mounting efficiency can be improved and the labor intensity can be reduced.

DETAILED DESCRIPTION OF THE PREFERRED EMBODIMENTS

Figure 1:
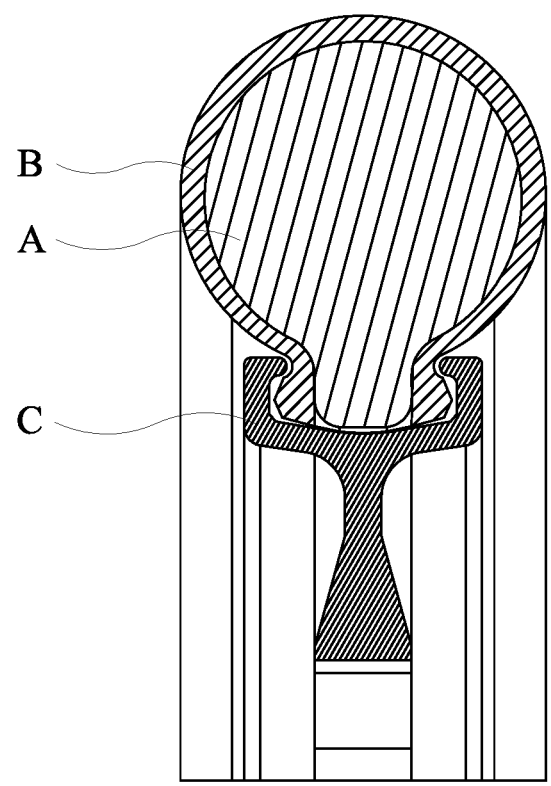
FIG. 1 is a schematic view showing the structure of a conventional wheel.
Figure 2:
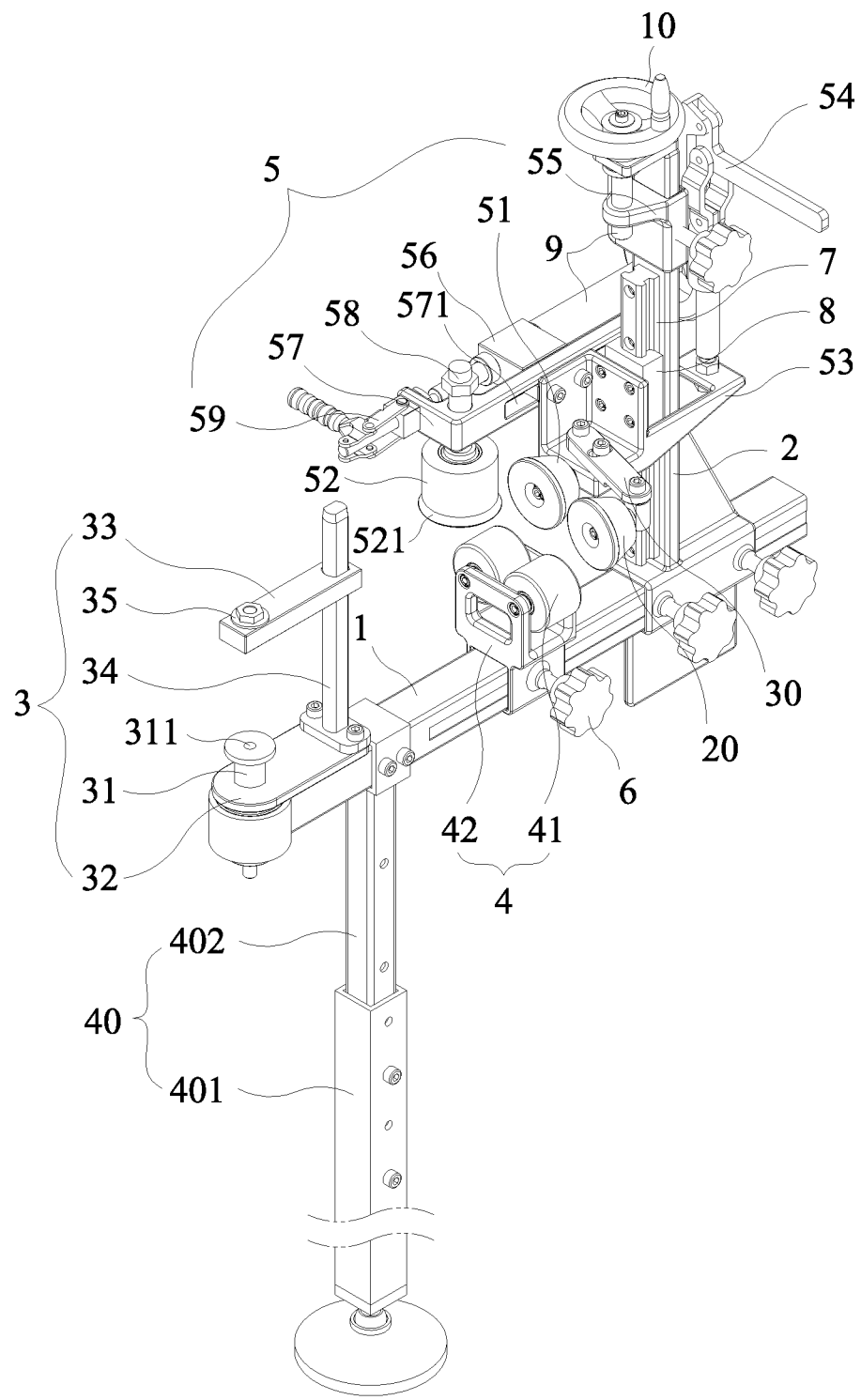
FIG. 2 is a perspective view according to a preferred embodiment of the present invention.
Figure 3:
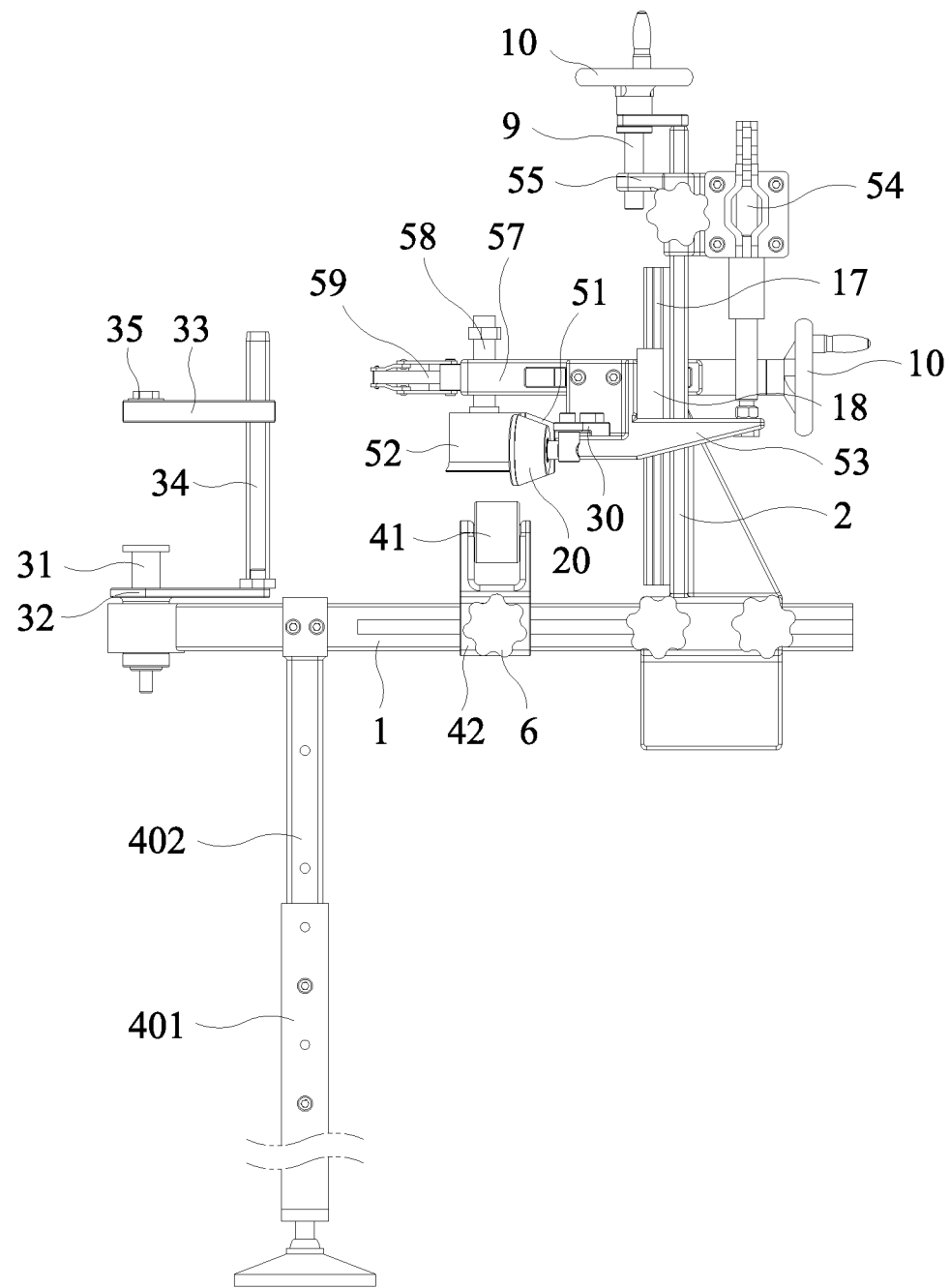
FIG. 3 is a front view according to the preferred embodiment of the present invention.
Figure 4:
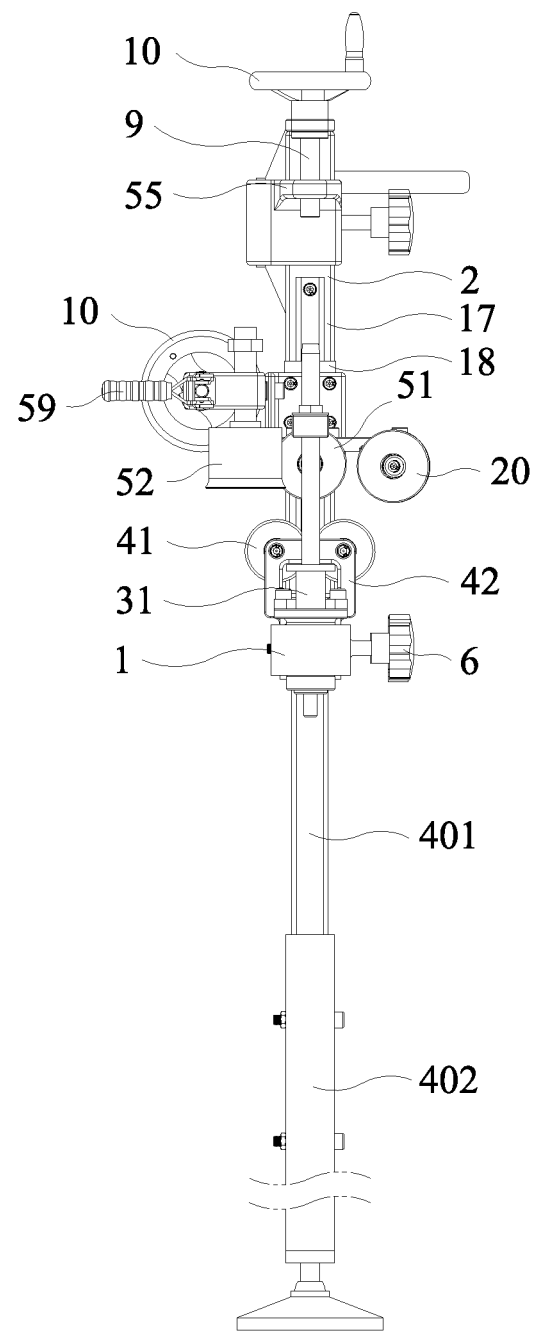
FIG. 4 is a left view according to the preferred embodiment of the present invention.
Figure 5:
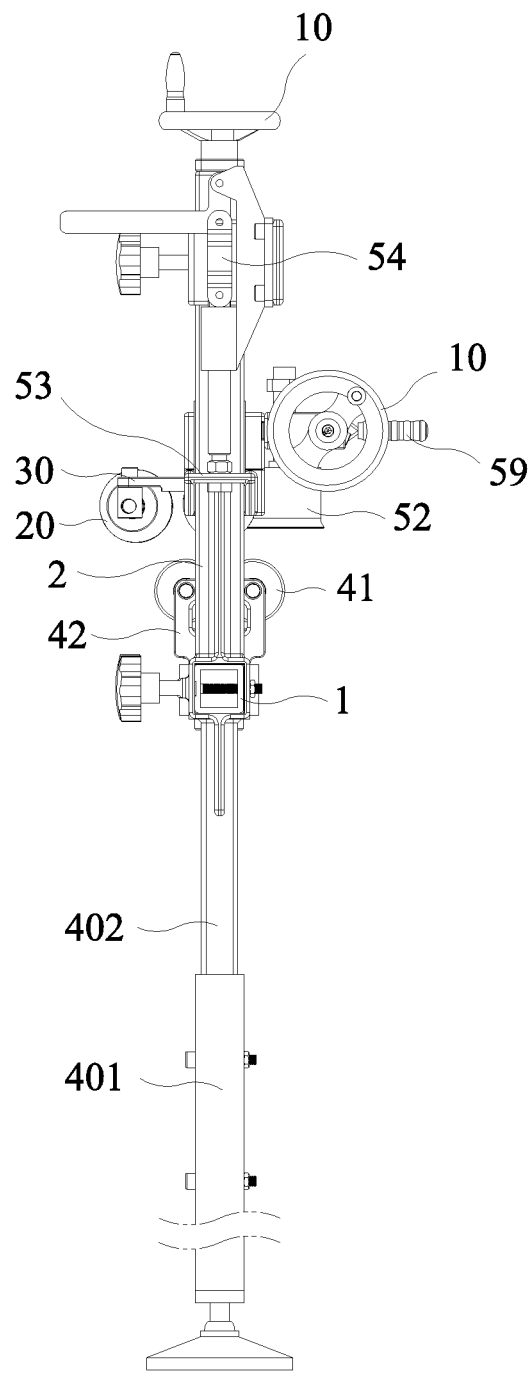
FIG. 5 is a right view of the preferred embodiment of the present invention.
Figure 6:
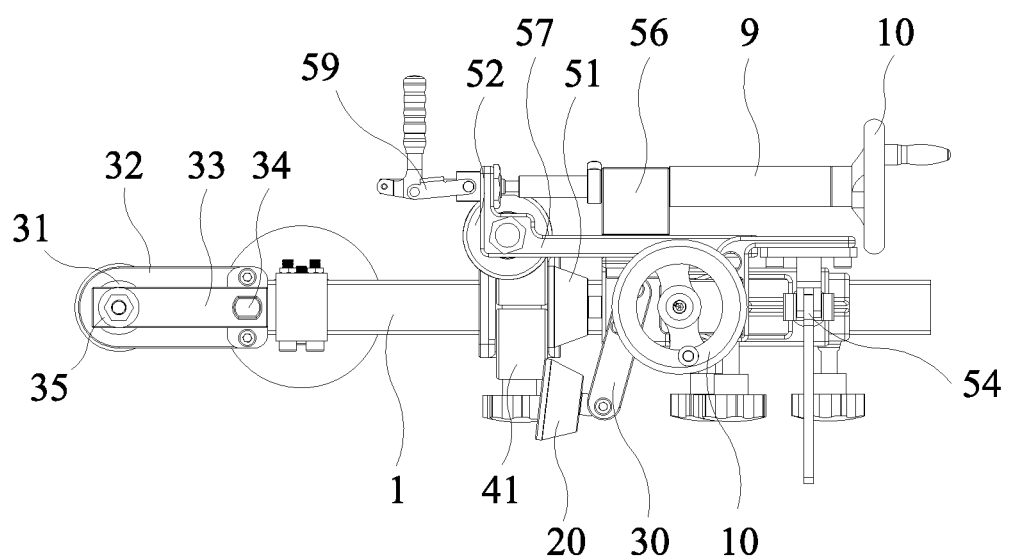
FIG. 6 is a top view according to the preferred embodiment of the present invention.

Embodiments of the present invention will now be described, by way of example only, with reference to the accompanying drawings.

The present invention provides a tire mounting apparatus, comprising a base 1, a mounting frame 2, a rim positioning mechanism 3, a wheel support mechanism 4, and a tire pressing mechanism 5.

The rim positioning mechanism 3, the wheel support mechanism 4 and the mounting frame 2 are disposed on the base 1 in sequence. The tire pressing mechanism 5 is disposed on the mounting frame 2, and is located above the wheel support mechanism 4.

The rim positioning mechanism 3 is configured to position the hub of a rim.

The wheel support mechanism 4 is configured to support the side peripheral edge of a wheel.

The tire pressing mechanism 5 is configured to press on the side peripheral edge of a tire for pressing the bead of the tire into the rim.

FIGS. 2 to 6 illustrate a preferred embodiment of the present invention are shown.

The rim positioning mechanism 3 includes a rim positioning platform 31 located at one end of the base 1. The upper end of the rim positioning platform 31 has a positioning hole 311 for insertion the hub of the rim. When the tire is to be installed, the lower end of the hub of the rim (the rim is laid flat) is inserted in the positioning hole 311. In the process of mounting the tire, the wheel can be rotated manually with the hub of the rim as the axis. In this embodiment, the rim positioning platform 31 is an adjustable screw rod that is threadedly connected to the base 1. By screwing the rim positioning platform 31, the height of the upper end of the rim positioning platform 31 can be adjusted to ensure that the peripheral edge of the rim can be attached to the wheel support mechanism 4 when the tire is to be mounted on the rim, so that the present invention can be used for rims of different widths (the spacing between the left and right sides of the rim).

The rim positioning mechanism 3 further includes a retaining plate 32, a press rod 33, a guide rod 34, and a press head 35. A first end of the retaining plate 32 is pivotally connected to one end of the base 1, so that the retaining plate 32 can rotate in the horizontal direction. The rim positioning platform 31 is disposed on the first end of the retaining plate 32. A lower end of the guide rod 34 is vertically connected to a second end of the retaining plate 32. When in use, the guide rod 34 is inserted between the spokes of the rim. One end of the press rod 33 is sleeved on the guide rod 34. The press rod 33 can be adjusted up and down. The press head 35 is disposed on the other end of the press rod 33 for positioning the upper end of the hub of the rim.

The wheel support mechanism 4 includes a lower roller 41 for rolling and supporting the side peripheral edge of the rim and a lower roller bracket 42 for installing the lower roller 41. The base 1 is in the form of a rod and is arranged horizontally. The lower roller bracket 42 is fitted on a middle portion of the base 1, and locked by a clamping knob 6. The lower roller 41 is rotatably connected to the lower roller bracket 42. A lower end of the mounting bracket 2 is fitted on the other end of the base 1, and is locked by a clamping knob 6. The positions of the lower roller bracket 42 and the mounting frame 2 on the base 1 are adjustable, that is, the positions can be adjusted according to the outer diameters of different wheels, so that the present invention can be used for wheels with different outer diameters.

The tire pressing mechanism 5 includes an upper roller 51 and a push roller 52. The upper roller 51 is located above one side of the wheel support mechanism 4 close to the mounting frame 2 for rolling and pressing down the side peripheral edge of the tire. The axial direction of the push roller 52 is arranged vertically. The push roller 52 is located above the wheel support mechanism 4 for pushing the bead of the tire out of the outer ring of the rim. In this embodiment, the rotating shafts of the lower roller 41 and the upper roller 51 are directed to the rim positioning platform 31, so as to ensure the synchronization of the rotation of the two rollers, thereby ensuring that the rim and the tire can rotate smoothly when the tire is to be mounted on the rim. A lower end of the push roller 52 has an annular guide flange 521 for pushing up the bead of the tire fitted on the rim to be out of the outer ring of the rim when the tire is mounted.

The tire pressing mechanism 5 further includes an upper roller bracket 53. The upper roller bracket 53 is slidably connected to the mounting frame 2. The upper roller bracket 53 can be moved up and down relative to the mounting frame 2. The upper roller 51 is rotatably connected to the end of the upper roller bracket 53. The push roller 52 is installed on the side of the upper roller bracket 53 and can move horizontally. The upper roller bracket 53 can be lifted and lowered on the mounting frame 2, so that the height of the upper roller 51 and the push roller 52 can be adjusted, which facilitates the rim and the tire to be placed on the tire mounting apparatus for mounting the tire on the rim. In this embodiment, the mounting frame 2 includes a slide rail 7 and a slider 8. The slide rail 7 is vertically disposed on the side of the mounting frame 2. The upper roller bracket 53 is slidably connected to the slide rail 7 through the slider 8 to realize its lifting function.

The tire pressing mechanism 5 further includes a first toggle clamp 54 (also called a quick-release clamp, Model No. CH-305HM). The first toggle clamp 54 is vertically mounted on the side of the mounting frame 2, and has a movable end connected to the upper roller bracket 53. By operating the first toggle clamp 54, the upper roller bracket 53 can be moved up and down and restricted. In this embodiment, the first toggle clamp 54 is mounted on the mounting frame 2 through a connecting plate 55. The connecting plate 55 is fitted on the mounting frame 2 and is positioned by an adjusting screw rod 9, and the height of the first toggle clamp 54 is adjusted by a hand wheel 10. By adjusting the height of the first toggle clamp 54, the lowest stroke of the movable end of the first toggle clamp 54 can be changed, that is, the lowest height value of the upper roller 51, so that the present invention can be used for tires of different widths.

The tire pressing mechanism 5 further includes a restricting block 56 connected to the side of the upper roller bracket 53, a push roller retaining block 57 slidably connected to the restricting block 56, a push rod 58 connected to the push roller retaining block 57, and a second toggle clamp 59 (Model No. CH-36204). The second toggle clamp 59 is mounted on the push roller retaining block 57, and has a movable end connected to the restricting block 56. The push roller 52 is rotatably connected to a lower end of the push rod 58. The second toggle clamp 59 can drive the push roller retaining block 57 to move horizontally relative to the restricting block 56, thereby driving the push roller 52 to move horizontally. In this embodiment, the push roller retaining block 57 has a slide groove 571. The restricting block 56 is slidably fitted with the slide groove 571. An adjusting screw rod 9 is disposed on the restricting block 56 for positioning the movable end of the second toggle clamp 59, and the position of the second toggle clamp 59 is adjusted by a hand wheel 10, so that the horizontal stroke of the push roller 52 can be changed. The present invention can be used for tires of different thicknesses (referring to the difference between the outer diameter and the inner diameter of a tire).

The present invention further includes an auxiliary roller 20 and a connecting rod 30. The auxiliary roller 20 is mounted on the upper roller bracket 53 through the connecting rod 30. The auxiliary roller 20 and the upper roller 51 are arranged side by side. The auxiliary roller 20 is configured to increase the area pressing the tire and improve the efficiency and quality of mounting the tire.

The present invention further includes a support frame 40 mounted under the base 1 for adjusting the height of the base 1. The support frame 40 includes a fixed rod 401 and a telescopic rod 402. The telescopic rod 402 is inserted in the fixed rod 401, and is telescopic relative to the fixed rod 401, thereby adjusting the height of the base 1.

Figure 7:
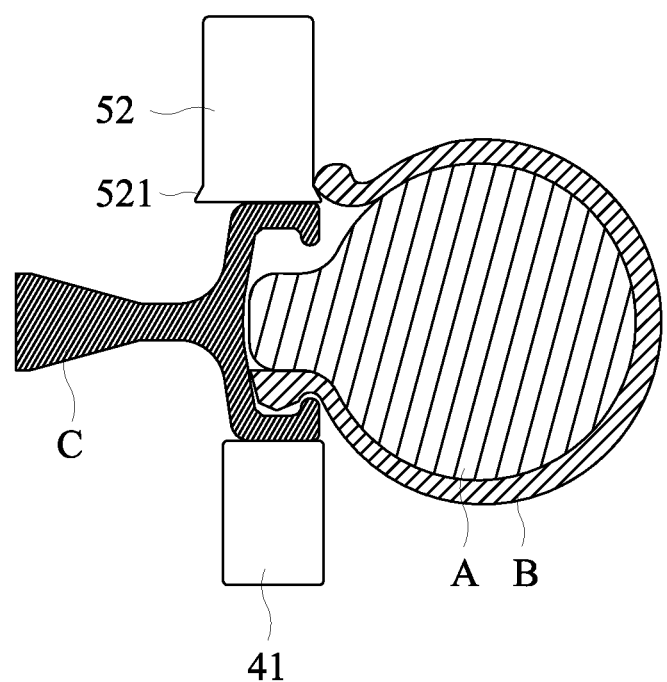
FIG. 7 is a first schematic view according to the preferred embodiment of the present invention when the tire is to be mounted on the rim.
Figure 8:
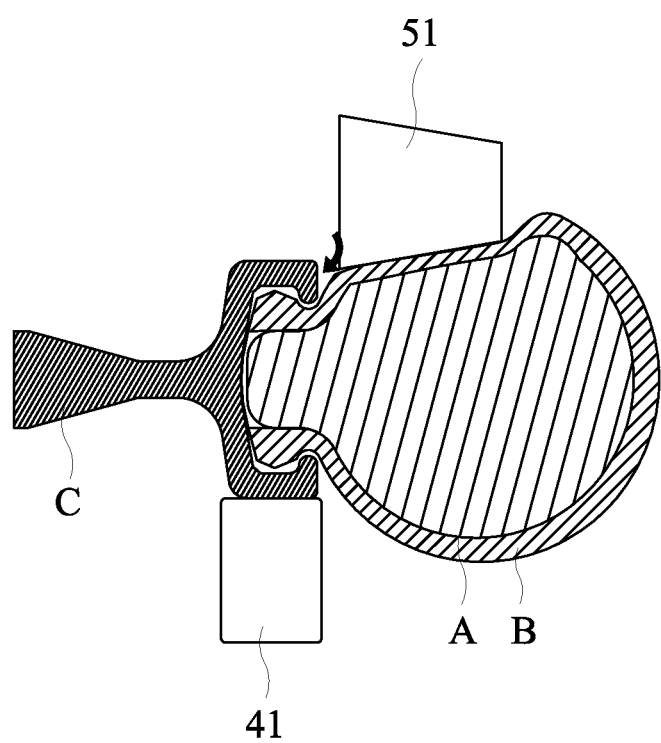
FIG. 8 is a second schematic view according to the preferred embodiment of the present invention when the tire is to be mounted on the rim.

Referring to FIG. 7 and FIG. 8, the working principle of the present invention is described below. When the tire is to be mounted, the hub of the rim C is first inserted on the rim positioning platform 31. Then, the outer tire B (PU tire) is put on the periphery of the rim C, and the solid inner tire A (ETPU tire) is inserted between the rim C and the outer tire B. One side of the tire (the solid inner tube A and the outer tire B) is pressed down by hand, and part of the tire is out of the outer ring of the rim C. Then, the part of the tire is turned to be under the upper roller 51. The first toggle clamp 54 is operated to put down the upper roller bracket 53, so that the upper roller 51 presses the tire. The second toggle clamp 59 is operated to move the push roller 52 horizontally to the bead of the tire. When the wheel is rotated horizontally by hand, the guide flange 521 of the push roller 52 will push up the part (bead) covering the upper surface of the rim C to be out of the outer ring of the rim C. Due to the restriction of the upper roller 51, the bead is engaged into the groove of the rim C. After the wheel is rotated a circle, the assembly of one side of the tire is completed. Then, the wheel is retracted and overturned, and the above operation is repeated.

Through the above solution, the present invention provides the wheel support mechanism 4 for supporting the wheel and the tire pressing mechanism 5 for pressing down the tire and for the bead of the tire to be engaged into the rim C. The wheel can be rotated manually when mounting the tire. During the rotation of the wheel with the rim positioning mechanism 3 as the axis, the entire bead of the tire can be evenly engaged into the groove of the rim C to complete the assembly. The invention is simple in operation and labor-saving. With the assistance of the present invention, the tire mounting efficiency can be improved and the labor intensity can be reduced.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A tire mounting apparatus, comprising a base, a mounting frame, a rim positioning mechanism, a wheel support mechanism, and a tire pressing mechanism;
   the rim positioning mechanism, the wheel support mechanism and the mounting frame being disposed on the base in sequence, the tire pressing mechanism being disposed on the mounting frame and located above the wheel support mechanism;
   the rim positioning mechanism being configured to position a hub of a rim;
   the wheel support mechanism being configured to support a side peripheral edge of a wheel;
   the tire pressing mechanism being configured to press a side peripheral edge of a tire for pressing a bead of the tire into the rim;
   wherein the rim positioning mechanism includes a rim positioning platform located at one end of the base, and an upper end of the rim positioning platform has a positioning hole for insertion the hub of the rim;
   the rim positioning mechanism further includes a retaining plate, a press rod, a guide rod, and a press head;
   a first end of the retaining plate is pivotally connected to the end of the base so that the retaining plate can rotate in a horizontal direction, the rim positioning platform is disposed on the first end of the retaining plate;
   a lower end of the guide rod is vertically connected to a second end of the retaining plate, when in use, the guide rod is inserted between spokes of the rim;
   one end of the press rod is sleeved on the guide rod, the press rod is adjustable up and down;
   the press head is disposed on another end of the press rod for positioning an upper end of the hub of the rim.

2. The tire mounting apparatus as claimed in claim 1, wherein the rim positioning platform is an adjustable screw rod that is threadedly connected to the base.

3. The tire mounting apparatus as claimed in claim 1, wherein the wheel support mechanism includes a lower roller for rolling and supporting a side peripheral edge of the rim and a lower roller bracket for installing the lower roller.

4. The tire mounting apparatus as claimed in claim 3, wherein the base is in the form of a rod and is arranged horizontally; the lower roller bracket is fitted on a middle portion of the base, the lower roller is rotatably connected to the lower roller bracket; and a lower end of the mounting frame is fitted on another end of the base.

5. The tire mounting apparatus as claimed in claim 1, wherein the tire pressing mechanism includes an upper roller and a push roller; the upper roller is located above one side of the wheel support mechanism close to the mounting frame for rolling and pressing down the side peripheral edge of the tire; an axial direction of the push roller is arranged vertically, and the push roller is located above the wheel support mechanism for pushing the bead of the tire out of an outer ring of the rim.

6. The tire mounting apparatus as claimed in claim 5, wherein a lower end of the push roller has an annular guide flange.

7. The tire mounting apparatus as claimed in claim 5, wherein the tire pressing mechanism further includes an upper roller bracket, the upper roller bracket is slidably connected to the mounting frame, the upper roller bracket is movable up and down relative to the mounting frame; the upper roller is rotatably connected to one end of the upper roller bracket, and the push roller is installed on one side of the upper roller bracket and is movable horizontally.

8. The tire mounting apparatus as claimed in claim 7, wherein the mounting frame includes a slide rail and a slider; the slide rail is vertically disposed on one side of the mounting frame, and the upper roller bracket is slidably connected to the slide rail through the slider.

9. The tire mounting apparatus as claimed in claim 7, wherein the tire pressing mechanism further includes a first toggle clamp, and the first toggle clamp is vertically mounted on the side of the mounting frame and has a movable end connected to the upper roller bracket.

10. The tire mounting apparatus as claimed in claim 9, wherein the first toggle clamp is mounted on the mounting frame through a connecting plate, the connecting plate is fitted on the mounting frame and is positioned by an adjusting screw rod, and the height of the first toggle clamp is adjustable through a hand wheel.

11. The tire mounting apparatus as claimed in claim 7, wherein the tire pressing mechanism further includes a restricting block connected to the side of the upper roller bracket, a push roller retaining block slidably connected to the restricting block, a push rod connected to the push roller retaining block and a second toggle clamp, the second toggle clamp is mounted on the push roller retaining block and has a movable end connected to the restricting block, and the push roller is rotatably connected to a lower end of the push rod.

12. The tire mounting apparatus as claimed in claim 11, wherein an adjusting screw rod is disposed on the restricting block for positioning the movable end of the second toggle clamp, and the position of the second toggle clamp is adjustable through a hand wheel.

13. The tire mounting apparatus as claimed in claim 7, further comprising an auxiliary roller and a connecting rod, the auxiliary roller being mounted on the upper roller bracket through the connecting rod, the auxiliary roller and the upper roller being arranged side by side.

* * * * *